(12) United States Patent
Lee et al.

(10) Patent No.: US 9,705,582 B2
(45) Date of Patent: Jul. 11, 2017

(54) METHOD FOR REDUCING COMPLEXITY OF MIMO RECEIVER WHICH SHARES PREPROCESSING FILTER IN A GROUP UNIT BY ADAPTIVELY USING COVARIANCE MATRIX

(71) Applicant: LG ELECTRONICS INC., Seoul (KR)

(72) Inventors: Kilbom Lee, Seoul (KR); Jiwon Kang, Seoul (KR); Kitae Kim, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/304,458

(22) PCT Filed: Apr. 30, 2015

(86) PCT No.: PCT/KR2015/004419
§ 371 (c)(1),
(2) Date: Oct. 14, 2016

(87) PCT Pub. No.: WO2015/170857
PCT Pub. Date: Nov. 12, 2015

(65) Prior Publication Data
US 2017/0041061 A1 Feb. 9, 2017

Related U.S. Application Data

(60) Provisional application No. 61/989,463, filed on May 6, 2014.

(51) Int. Cl.
| H04B 7/08 | (2006.01) |
| H04B 7/04 | (2017.01) |
| H04B 7/0413 | (2017.01) |

(52) U.S. Cl.
CPC .............. *H04B 7/08* (2013.01); *H04B 7/04* (2013.01); *H04B 7/0413* (2013.01)

(58) Field of Classification Search
CPC .......... H04B 7/04; H04B 7/0413; H04B 7/08
See application file for complete search history.

(56) References Cited

U.S. PATENT DOCUMENTS

| 2007/0041475 A1 | 2/2007 | Koshy et al. |
| 2009/0213945 A1 | 8/2009 | Cairns et al. |
| 2012/0114054 A1 | 5/2012 | Waters et al. |

(Continued)

*Primary Examiner* — Syed Haider
(74) *Attorney, Agent, or Firm* — Birch, Stewart, Kolasch & Birch, LLP

(57) ABSTRACT

Disclosed is a method for processing a reception signal, and a MIMO receiver, the method comprising a step in which: a reference resource element (RE) is selected within an RE group that comprises a plurality of REs; generated is a preprocessing filter which will be shared by the plurality of REs in the RE group on the basis of channel information of the reference RE; on the basis of channel information of the plurality of REs other than the reference RE, generated is a covariance matrix with respect to each of the REs other than the reference RE; and reception signals with respect to each of the plurality of REs are offset by selectively using the preprocessing filter and the covariance matrix, and thereby detection signals with respect to the RE group are generated.

18 Claims, 12 Drawing Sheets

(56) References Cited

U.S. PATENT DOCUMENTS

| | | |
|---|---|---|
| 2012/0155560 A1 | 6/2012 | Koshy |
| 2013/0016767 A1* | 1/2013 | Pean ............... H04L 1/0001 375/232 |
| 2013/0051505 A1* | 2/2013 | Singh ............ H04L 25/0256 375/346 |
| 2013/0163462 A1* | 6/2013 | Ohwatari ......... H04B 7/0865 370/252 |
| 2014/0098840 A1 | 4/2014 | Christensen |
| 2015/0092583 A1* | 4/2015 | Balraj ............. H04L 1/0003 370/252 |
| 2015/0131758 A1* | 5/2015 | Chen ............... H04B 1/1027 375/340 |
| 2015/0256279 A1* | 9/2015 | Davydov ........... H04W 72/12 370/329 |
| 2015/0326364 A1* | 11/2015 | Koivisto ............ H04L 5/006 370/329 |

* cited by examiner 1110    1120    1130

FIG. 18

Iteration=1

| Nr\Ns | 3 | 4 | 5 | 6 | 7 | 8 |
|---|---|---|---|---|---|---|
| 4 | 23.2% | 15.6% | - | - | - | - |
| 8 | 29.3% | 20.5% | 12.8% | 6.0% | 0.0% | -5% |
| 16 | 33.8% | 24.4% | 15.6% | 7.5% | 0.0% | -7% |

Iteration=2

| Nr\Ns | 3 | 4 | 5 | 6 | 7 | 8 | ? | 12 |
|---|---|---|---|---|---|---|---|---|
| 4 | 30.7% | 24.0% | - | - | - | - | ? | - |
| 8 | 40.0% | 32.5% | 26.0% | 20.0% | 15.0% | 10% | - | - |
| 16 | 47.0% | 39.0% | 32.0% | 20.0% | 20.0% | 14% | ? | -4.20% |

Iteration=3

| Nr\Ns | 3 | 4 | 5 | 6 | 7 | 8 | ? | 16 |
|---|---|---|---|---|---|---|---|---|
| 4 | 34.5% | 28.3% | - | - | - | - | ? | - |
| 8 | 45.5% | 38.8% | 33.0% | 27.8% | 23.2% | 19% | - | - |
| 16 | 54.0% | 47.4% | 41.3% | 35.7% | 30.5% | 26% | ? | -2.8 |

Iteration=4

| Nr\Ns | 3 | 4 | 5 | 6 | 7 | 8 | ? | 16 |
|---|---|---|---|---|---|---|---|---|
| 4 | 36.8% | 30.9% | - | - | - | - | ? | - |
| 8 | 48.5% | 42.5% | 37.0% | 32.3% | 28.0% | 24% | - | - |
| 16 | 58.0% | 52.4% | 46.8% | 41.7% | 37.0% | 33% | ? | 6.8% |

METHOD FOR REDUCING COMPLEXITY OF MIMO RECEIVER WHICH SHARES PREPROCESSING FILTER IN A GROUP UNIT BY ADAPTIVELY USING COVARIANCE MATRIX

CROSS REFERENCE TO RELATED APPLICATIONS

This application is the National Phase of PCT/KR2015/004419 filed on Apr. 30, 2015, which claims priority under 35 U.S.C. §119(e) to U.S. Provisional Application No. 61/989,463 filed on May 6, 2014, all of which are hereby expressly incorporated by reference into the present application.

TECHNICAL FIELD

The present invention relates to technology related to a method of reducing implementation complexity and memory requirements while minimizing performance deterioration of a receiver in a massive multiple input multiple output (MIMO) environment.

BACKGROUND ART

A multiple input multiple output (MIMO) system refers to a wireless communication system using multiple transmit antennas and multiple receive antennas. In a MIMO system, fading effects occurring in a radio channel may be minimized via a diversity scheme or a plurality of streams may be simultaneously transmitted via spatial multiplexing, thereby improving throughput. If the number of transmit antennas is $N_t$ and the number of receive antennas is $N_r$, a maximum number of streams transmittable in a spatial multiplexing (SM) scheme is $\min(N_t, N_r)$. In particular, in a high signal-to-noise ratio (SNR) environment, it is known that the slope of communication capacity is $\min(N_t, N_r)$. Since communication capacity means a maximum amount of information theoretically transmittable on a given channel, communication capacity also increases when the numbers of transmit and receive antennas simultaneously increase.

A massive MIMO system having vast transmit and receive antennas is attracting considerable attention as 5G technology. In many papers and experiments, the massive MIMO system includes one base station (including a distributed antenna system) having multiple antennas and a plurality of user equipments (UEs) each having one antenna. In this case, since the UE has one antenna but several UEs simultaneously receive services from one base station, channels between the base station and the UEs may be understood as MIMO. If the total number of UEs is K, the slope of communication capacity is expressed by $\min(N_t, K)$ in a high SNR environment.

Theoretically, when a base station having an infinite number of transmit antennas simultaneously transmits data to several UEs, an optimal transmission algorithm of the base station is a maximal ratio transmission (MRT) algorithm. When one base station receives data transmitted from several UEs to the base station, an optimal reception algorithm of the base station is a maximal ratio combining (MRC) algorithm. Since the MRT and MRC algorithms do not take into account interference, if the number of antennas is finite, performance deterioration occurs but, if the number of antennas is infinite, interference disappears. Therefore, the MRT and MRC algorithms may become optimal solutions.

Since a base station can generate a sharp beam sharp via antenna beamforming, the base station may concentrate energy on a specific UE. In this case, the same information may be transmitted with low power and interference with neighboring UEs may be minimized, thereby minimizing system performance deterioration.

DISCLOSURE

Technical Problem

An object of the present invention devised to solve the problem lies in a method of reducing received-signal detection complexity while maintaining performance of a receiver in a massive multiple input multiple output (MIMO) environment.

Another object of the present invention is to efficiently improve computational complexity by selectively determining whether a covariance matrix is used according to change in communication environment.

The technical problems solved by the present invention are not limited to the above technical problems and other technical problems which are not described herein will become apparent to those skilled in the art from the following description.

Technical Solution

The object of the present invention can be achieved by providing a method of processing received signals at a multiple input multiple output (MIMO) receiver including a plurality of antennas including selecting a reference resource element (RE) from an RE group including a plurality of REs, generating a preprocessing filter to be shared among the plurality of REs of the RE group based on channel information of the reference RE, generating covariance matrices of the REs except for the reference RE based on channel information of the REs except for the reference RE of the plurality of REs, and generating detection signals of the RE group by compensating for the received signals of the plurality of REs by selectively using the preprocessing filter and the covariance matrices.

The generating the detection signals may include determining whether the covariance matrices are used, based on at least one of the number of receive antennas of the MIMO receiver, the number of layers of the received signals and a predetermined iteration number of the compensation process.

The covariance matrices may be generated upon determining that computational complexity of the case where the covariance matrices are used is less than that of the case where the covariance matrices are not used, based on at least one of the number of receive antennas, the number of layers and the iteration number.

The generating the detection signals may include compensating for the received signals using the channel information of the plurality of REs and the preprocessing filter, if the computational complexity of the case where the covariance matrices are used is higher than that of the case where the covariance matrices are not used.

The generating the detection signals may include compensating for the reference RE using only the preprocessing filter and compensating for the REs except for the reference RE using the preprocessing filter and the covariance matrices.

The generating the covariance matrices may include generating a covariance matrix of the reference RE based on the channel information of the reference RE, and the generating the detection signals may include compensating for the received signal of the reference RE using the preprocessing filter and the covariance matrix of the reference RE with respect to the reference RE.

The preprocessing filter may be a matrix for improving the speed of a process of compensating for the received signals and generating the detection signals.

The generating the detection signals may include iteratively performing the compensation process until an error between each detection signal and a result obtained by applying a minimum mean square error (MMSE) filter, a zero filter (ZF) filter, an interference rejection combining (IRC) filter or a BLAST filter to each RE instead of the preprocessing filter becomes less than a threshold, and a maximum iteration number of the compensation process is determined according to a MIMO channel environment or user input.

The detection signals may be generated by applying a conjugate gradient (CG) algorithm, a Newton method algorithm or a steepest descent method algorithm to the received signals using the covariance matrices.

In another aspect of the present invention, provided herein is a multiple input multiple output (MIMO) receiver including a plurality of antennas and configured to process signals received through the plurality of antennas including a transmitter, a receiver, and a processor connected to the transmitter and the receiver and configured to process the received signals, wherein the processor selects a reference resource element (RE) from an RE group including a plurality of REs, generates a preprocessing filter to be shared among the plurality of REs of the RE group based on channel information of the reference RE, generates covariance matrices of the REs except for the reference RE based on channel information of the REs except for the reference RE of the plurality of REs, and generates detection signals of the RE group by compensating for the received signals of the plurality of REs by selectively using the preprocessing filter and the covariance matrices.

Advantageous Effects

According to the embodiments of the present invention have the following effects.

First, since covariance matrices using channel information of REs are generated in advance and used, complexity per algorithm iteration is reduced and thus computational complexity gain is increased.

Second, since a determination as to whether a covariance matrix is used is selectively made, it is possible to efficiently improve computational complexity according to change in communication environment.

Third, when a covariance matrix is used, the same performance as when the covariance matrix is not used can be obtained. Therefore, it is possible to obtain computational complexity gain without deteriorating performance.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

FIG. 18 is a table showing comparison between computational complexities according to iteration number in a signal detection method of a MIMO receiver according to an embodiment of the present invention.

BEST MODE

Figure 1:
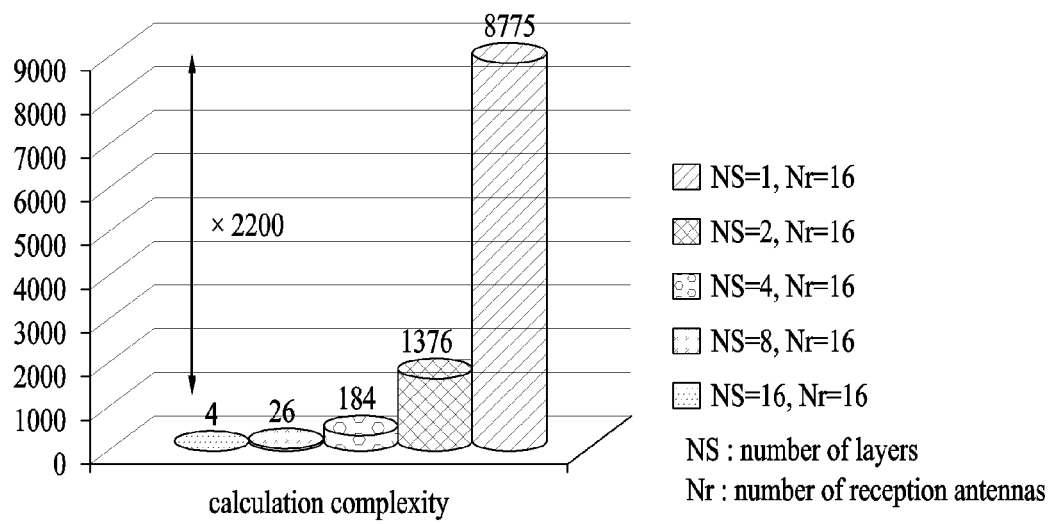
FIG. 1 is a diagram showing computational complexity according to the number of received streams in a multiple input multiple output (MIMO) environment, in relation to the present invention.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a $3^{rd}$ Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. Massive MIMO Receiver

To establish a massive MIMO system, a massive MIMO reception algorithm must be developed. As compared to an existing MIMO system, in a massive MIMO system, a receiver needs to be improved in terms of the following two aspects.

Figure 2:
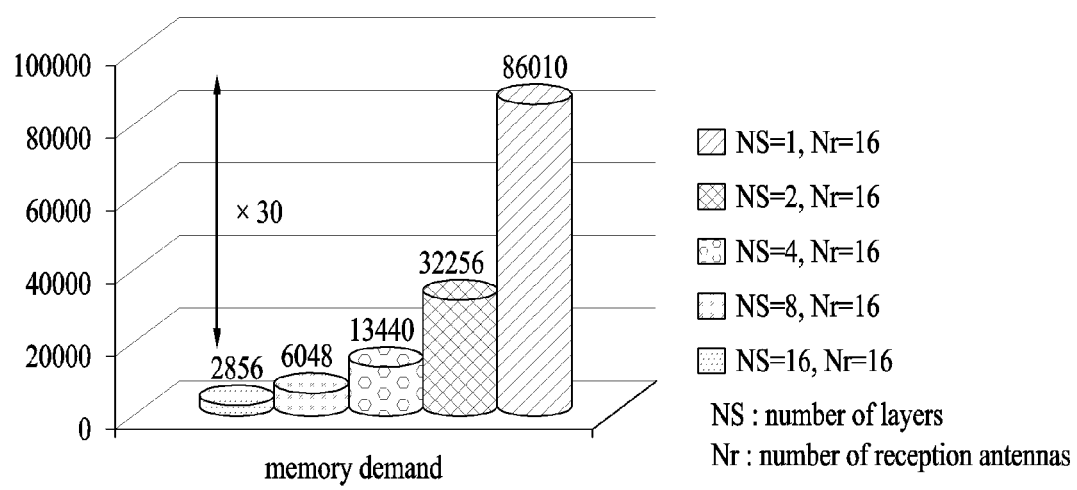
FIG. 2 is a diagram showing memory requirements according to the number of received streams in a MIMO environment, in relation to the present invention.

First, in a massive MIMO environment, the number of data streams simultaneously received by the receiver increases. Increase in the number of simultaneously processed data streams leads to increase in computational complexity and memory requirements. This leads to increase in system implementation cost and processing time, thereby imposing a burden on a reception system. Computational complexity and memory requirements according to the number of received streams of an existing MIMO reception algorithm exponentially increase as shown in FIGS. 1 and 2.

Second, in the massive MIMO environment, as the number of interference sources increases, a reception algorithm having improved interference cancellation performance is required. In the massive MIMO system, when a base station simultaneously transmits data to several tens or hundreds of users, each user receives several tens or more of multi-user interference signals except for a data signal transmitted thereto. Accordingly, there is a need for a massive MIMO reception algorithm for efficiently cancelling such interference signals. In addition, efficient cancellation of interference received from neighboring cells or users of neighboring cells is also required.

In order to solve such technical problems, the following technical issues are considered.

First, increase in computational complexity and memory requirements in a massive MIMO environment will be described. If the number of antennas of a transmitter is always greater than the number of antennas of a receiver, the number of streams transmitted by the transmitter is increased in proportion to the number of antennas of the receiver. At this time, the receiver uses a reception filter in order to detect each stream from a received signal. In an LTE system, the filter should be recomputed in every subframe.

Load caused due to such a computation process may be quantified to computational complexity and memory requirements. Complexity and memory requirements are proportional to the square or cube of the number of received streams. Accordingly, as the number $N_s$ of received streams increases, computational complexity and memory requirements rapidly increase, as shown in FIG. 1. Further, since hardware specification is determined by the worst case, hardware implementation cost significantly increases as the number of streams increases.

Hereinafter, a reception algorithm of a conventional MIMO receiver and/or computational complexity and memory requirements according to filter will be described.

The MRC algorithm requires smallest computational complexity $O(N_s^2)$ and memory. However, the MRC algorithm does not take into account interference between streams and thus provides low performance (that is, low reception SINR).

A minimum mean square error (MMSE) filter provides the best performance (that is, high reception SINR) among linear detection methods. However, complexity is expressed by $O(N_s^3)$ $O(N_s^2)$ and additional memories for inverse matrix operation are required. FIGS. 1 and 2 show complexity and memory requirements according to the number of received streams of the MMSE filter, respectively.

For reception using the MMSE filter, an inverse matrix operation for a channel matrix is necessary. The size of the inverse matrix is determined by the number of received streams and, for example, a time required for a high performance field programmable gate array (FPGA) to obtain a 15×15 inverse matrix is about 150 µs. Such time delay corresponds to about 30% of a coherence time of 500 µs assumed in an LTE channel model.

In addition, for inverse matrix operation for MMSE reception, a process of moving all channel information to a new memory is necessary, thereby leading to significant delay. In addition, a processor accesses a memory for inverse matrix operation, thereby leading to additional delay. Such delay significantly increases system processing time.

Lastly, an interference cancellation (IC) filter is a non-linear detection method and can obtain performance corresponding to maximum communication capacity in a D-BLAST receiver which is an example of IC. A V-BLAST receiver having low implementation complexity is configured in the form of a hybrid of MMSE and SIC. In particular, in a MIMO-OFDM environment, the V-BLAST receiver has performance close to maximum communication capacity as channel selectivity increases. However, since the V-BLAST receiver is also based on the MMSE filter, complexity and memory requirements higher than those of the MMSE filter are required.

In addition, the IC method cancels previously detected symbols and layers from a received signal to control interference. Accordingly, if the previously detected values have errors, an error propagation phenomenon in which detection performance deteriorates occurs. Various IC algorithms for solving such a problem have been proposed but have increased complexity as compared to the conventional method.

Figure 3:
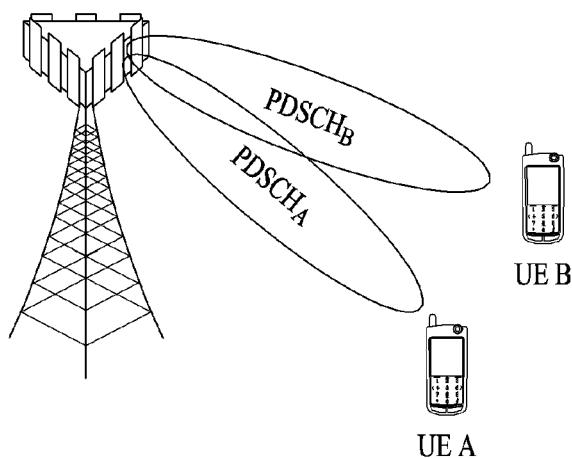
FIG. 3 is a diagram showing interference between UEs in the same cell in a MIMO environment in relation to the present invention.
Figure 4:
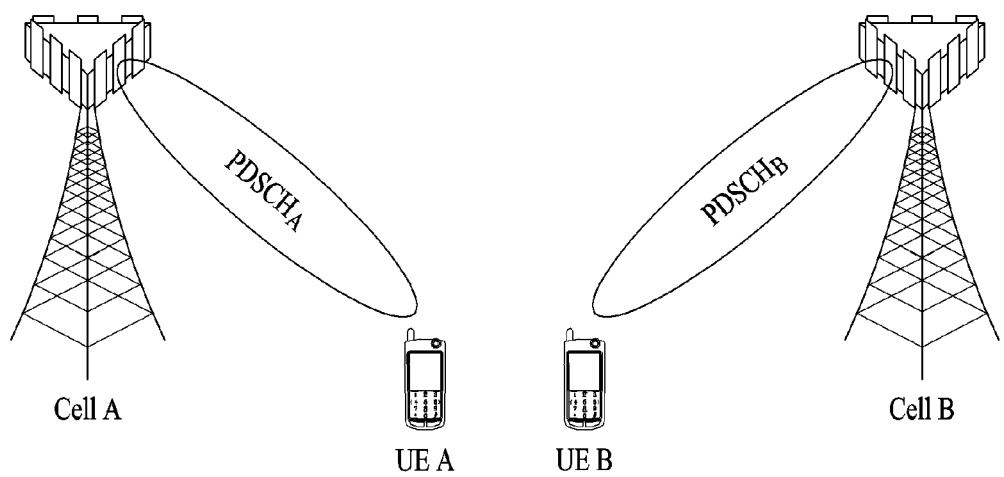
FIG. 4 is a diagram showing interference between neighboring cells in a MIMO environment in relation to the present invention.

FIG. 3 is a diagram showing interference between UEs in the same cell in a MIMO environment in relation to the present invention. FIG. 4 is a diagram showing interference between neighboring cells in a MIMO environment in relation to the present invention. In addition to increase in computational complexity and memory requirements, interference occurring in a massive MIMO environment will be described with reference to FIGS. 3 and 4.

If the number of antennas of a base station is large, one base station may simultaneously support a plurality of UEs. In this case, a signal transmitted from the base station to a UE A acts as interference with respect to a UE B and a signal transmitted to the UE B acts as interference with respect to the UE A. Since the interference is transmitted by the base station along with a desired signal, the interference undergoes the same path loss as the desired signal. Accordingly, power of the interference signal is similar to that of the desired signal and thus a reception SINR is rapidly reduced. In order to solve such a problem, the base station may perform multi user (MU)-MIMO precoding to minimize interference. However, even in this case, it is difficult to completely cancel multi-user interference due to channel information errors, aging phenomena and codebook size restriction.

In a multi-cell environment, interference among various cells is caused. Representatively, in the environment of FIG. 4, the UE A is influenced by interference from a base station B and the UE B is influenced by interference from a base station A. In particular, when a UE is close to a boundary between neighboring cells, the UE receives stronger interference from the neighboring base station. In addition, when a gap between cells is narrow as in a small cell (e.g., a micro cell, a pico cell, a femto cell, etc.), a probability that a UE receives strong interference from a neighboring cell is further increased.

In a dense multi-cell environment employing a massive MIMO method, interference cancellation capabilities of a MIMO receiver need to be improved. In particular, if strong interference is caused, an interference cancellation (IC) reception algorithm is required and an existing IC receiver requires more antennas than the number of interference sources. For example, the receiver requires 11 receive antennas in order to cancel 10 interference sources. In a small-sized UE in which a sufficient number of antennas may not be mounted, technologies for solving such a limitation need to be introduced. For example, improved interference suppression (IS) technology applies to multi-user or multi-cell interference or interference alignment technology is utilized in a transmitter to align interference in a specific signal space and an IC receiver is applied to cancel interference from many interference sources using a restricted number of receive antennas.

Figure 5:
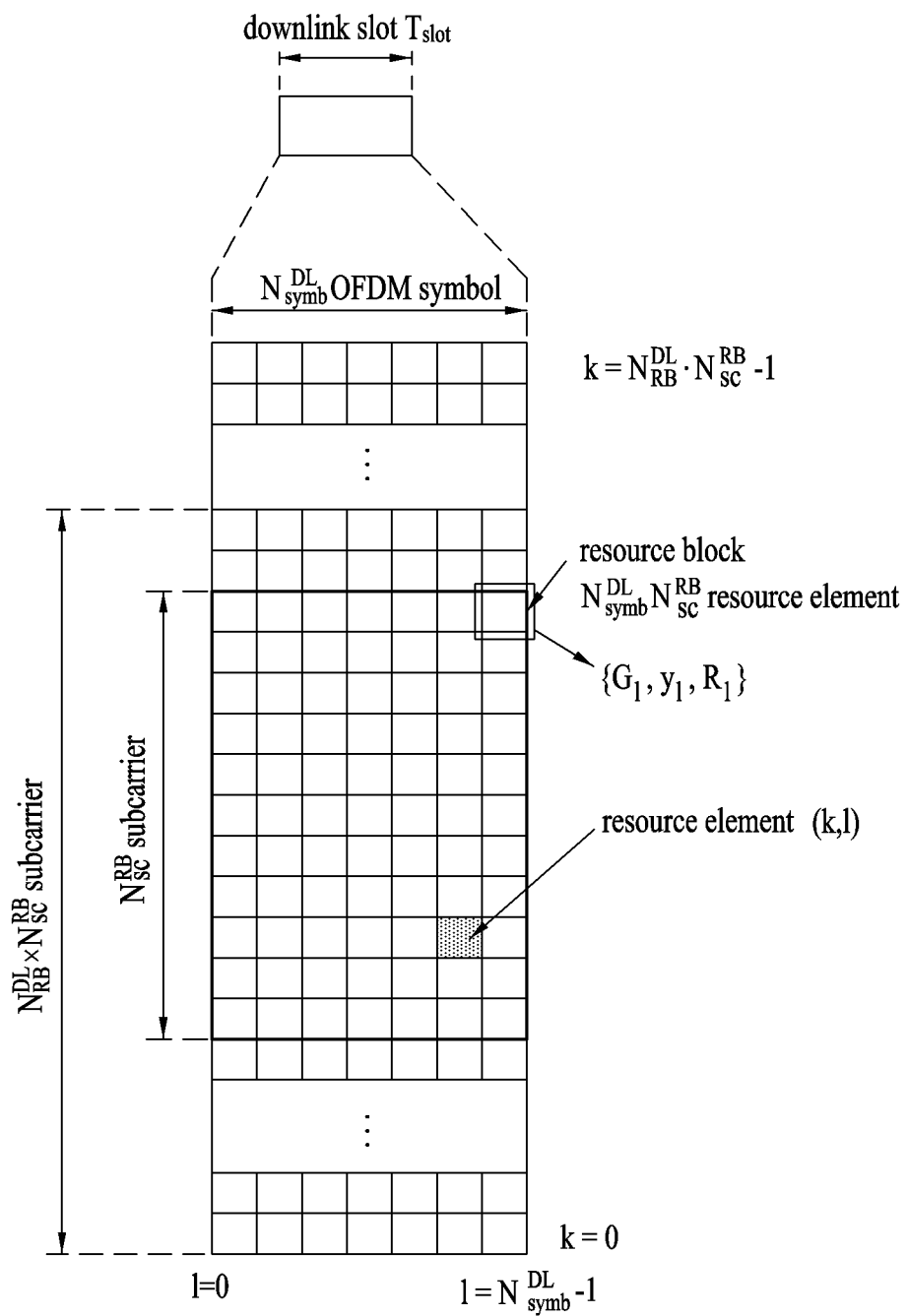
FIG. 5 is a diagram showing the structure of a resource block (RB) assigned to a UE in relation to the present invention.
Figure 6:
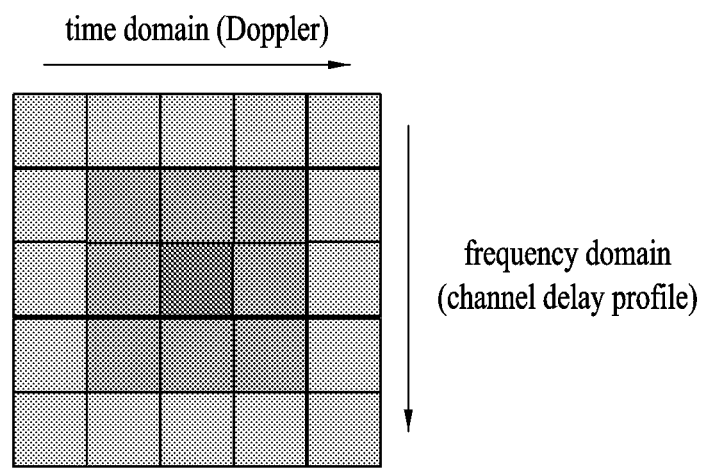
FIG. 6 is a diagram showing a resource element (RE) group formed by a plurality of REs in relation to the present invention.
Figure 7:
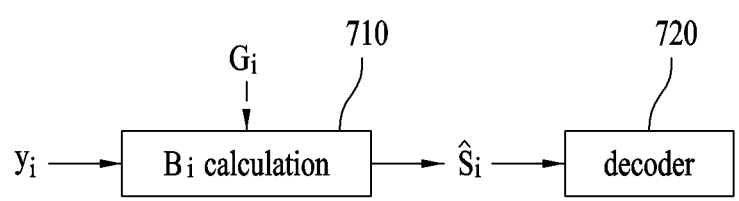
FIG. 7 is a diagram showing a conventional MIMO receiver operational process in relation to the present invention.

Subsequently, an operation algorithm of a conventional MIMO receiver will be described in relation to the above-described problems. FIG. 5 is a diagram showing the structure of a resource block (RB) assigned to a UE in relation to the present invention. FIG. 6 is a diagram showing a resource element (RE) group formed by a plurality of REs in relation to the present invention. FIG. 7 is a diagram showing a conventional MIMO receiver operational process in relation to the present invention.

FIG. 5 shows one RB assigned to a specific UE and vertical and horizontal axes respectively denote frequency and time axes. One RB is composed of $N_{SC}^{RB}N_{symb}^{DL}$ REs and, in each RE, a received signal is expressed by Equation 1 below.

$$y_l = G_l s_l + i_l + w_l, \quad l=0, \ldots, N_{SC}^{RB}N_{symb}^{DL}-1 \quad \text{Equation 1}$$

In Equation 1, l denotes an index of an RE, $G_l$ denotes a channel estimated via a demodulation reference signal (DMRS) in a receiver, $s_l$ denotes a transmitted signal, and $I_l$ denotes interference. $w_l$ denotes white noise and a covariance matrix of $w_l$ is $\sigma_w^2 I$.

As described above, the receiver may use a minimum mean square error (MMSE) filter in order to cancel influence of a channel from a received signal. A transmitted signal detected from the received signal using the MMSE filter is expressed by Equation 2 below.

$$\hat{s}_l = B_l y_l \text{ with } B_l = (G_l^H G_l + R_l)^{-1} G_l^H \quad \text{Equation 2}$$

In Equation 2, $B_l$ denotes an MMSE filter and $\hat{s}_l$ denotes a transmitted signal estimated via the MMSE filter. A covariance matrix $R_l$ is defined as $R_l = i_l i_l^H + \sigma_w^2 I$. At this time, computational complexity of multiplication of complex numbers necessary to estimate the transmitted signal using the MMSE filter may be schematically expressed by Equation 3 below.

$$\left(\frac{1}{2}N_r N_s^2 + \frac{1}{2}N_s^3 + N_s^2 + N_r N_s\right) N_{RB}^{DL} N_{symb}^{DL} \quad \text{Equation 3}$$

In case of massive MIMO, the number $N_r$ of receive antennas is large and, in this case, streams corresponding in number $N_s$ to a maximum number of receive antennas may be received. In this case, communication capacity of the receiver may be improved by a maximum of $N_s$ times but complexity is rapidly increased in proportion to the cube $O(N_s^3)$ of the number of streams. Accordingly, if the number of received streams is large, a receiver capable of performing processing with low complexity while minimizing performance deterioration is necessary.

FIG. 6 shows a portion of an RB of FIG. 5 and shows an RE group composed of several REs. At this time, channels of the REs may have mutual correlation. In particular, if the Doppler effect is small (the receiver is slowly moved or is fixed), correlation between the REs located on the same horizontal axis is large. If power delay spread of a channel is low, correlation between the REs located on the same vertical axis is large. If the Doppler effect is small and power delay spread of the channel is low, correlation between all REs shown in FIG. 6 is large. In FIG. 6, correlation between a center RE and a peripheral RE is shown by the depth of shade. That is, as the depth of shade of each RE increases, correlation with the center RE increases and, as the depth of shade of each RE decreases, correlation with the center RE decreases.

As shown in FIG. 7, a conventional MIMO receiver has applied to the same operation to REs without considering correlation between the REs to detect a transmitted signal. That is, the conventional MIMO receiver has performed a process of computing a filter $B_i$ from channel information $G_i$ per RE with respect to a received signal (710) and detecting and decoding a received signal with respect to each RE (720). However, when taking into account increase in computational complexity and memory requirements due to increase in number of streams in a massive MIMO environment, a conventional reception algorithm needs to be improved.

Hereinafter, a MIMO receiver operating according to an algorithm having lower complexity while providing the same performance as an existing algorithm using correlation between REs is proposed.

2. Method of Operating MIMO Receiver Using Preprocessing Filter

Figure 8:
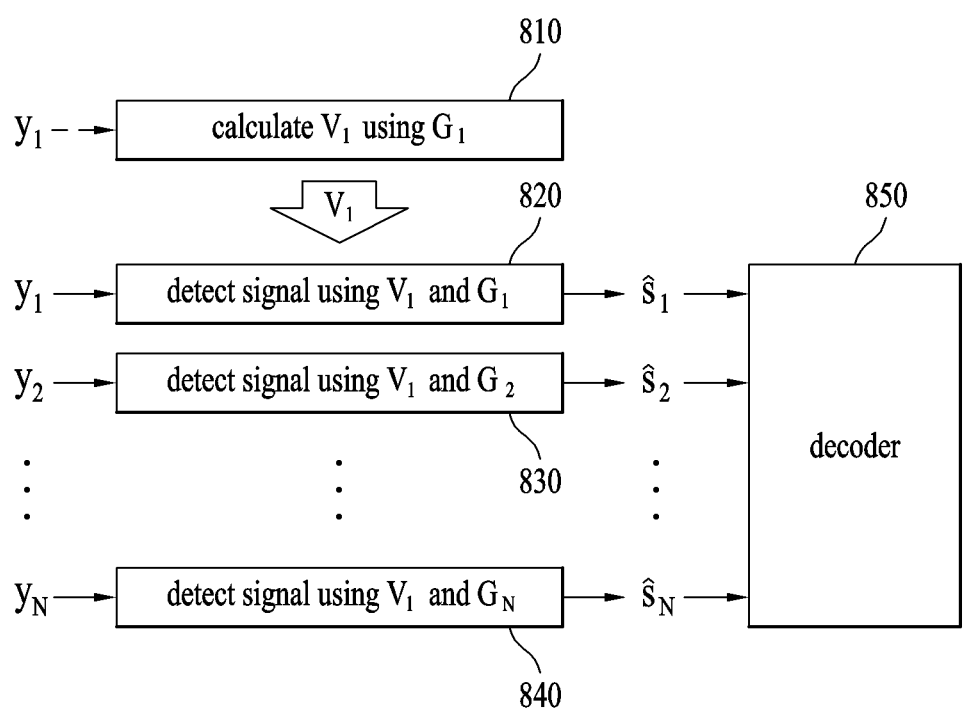
FIG. 8 is a diagram showing a MIMO receiver operational process related to the present invention.

FIG. 8 is a diagram showing a process of operating a MIMO receiver using a preprocessing filter according to an embodiment of the present invention.

A MIMO receiver using the preprocessing filter configures a plurality of REs having relatively large correlation between channels as one RE group (having a size of N), as described with reference to FIG. 6. Hereinafter, a signal $\hat{s}_l$ detected using a received signal detector (e.g., an MMSE filter) from a received signal of an l-th RE of an RE group is defined as a "detection signal". In the case of the MIMO receiver described with reference to FIG. 7, if the number of layers is large in a process of detecting the detection signal from the received signal, the complexity problems of FIG. 1 occur. In order to reduce such complexity, the proposed MIMO receiver uses a numerical analysis algorithm (e.g., a conjugate gradient (CG) algorithm), instead of directly computing the MMSE filter to detect the detection signals of the REs of the RE group.

Hereinafter, $v_1$ means a "preprocessing filter (or an acceleration filter)" generated based on the MIMO channel of a first RE of the RE group. The above-described numerical analysis algorithm finds a value through an iterative computation process and a value becomes close to an accurate value as the iterative computation process proceeds. If the preprocessing filter $v_1$ is used in the iterative computation process, the MIMO receiver can find a desired value with a small iteration number (that is, at a high speed).

However, generating the preprocessing filter capable of sufficiently increasing the speed in order to find the desired value as described above requires high complexity. Accordingly, in order to decrease computational complexity of the case of obtaining the respective preprocessing filters with respect to all of the REs of the RE group, a preprocessing filter may be generated with respect to a specific RE (e.g., the first RE) and may be shared among the other REs of the RE group. That is, in the process of detecting the detection signals with respect to the REs of the RE group, the numerical analysis algorithm uses the same preprocessing filter. The specific RE (or the first RE) may be defined as a "reference RE", which is used to compute the preprocessing filter and is not related to the order or index of the RE in the RE group.

Accordingly, if channel correlation between REs in the group is large, the proposed MIMO receiver shares the preprocessing filter (810) generated from one RE among all of the REs of the RE group and the numerical analysis algorithm generates the detection signals using the preprocessing filter (820, 830 and 840). Accordingly, the same performance can be obtained with less complexity than the conventional MIMO receiver. As channel correlation between the first RE and another RE in the RE group increases, such iteration speed shortening effects increase.

Figure 9:
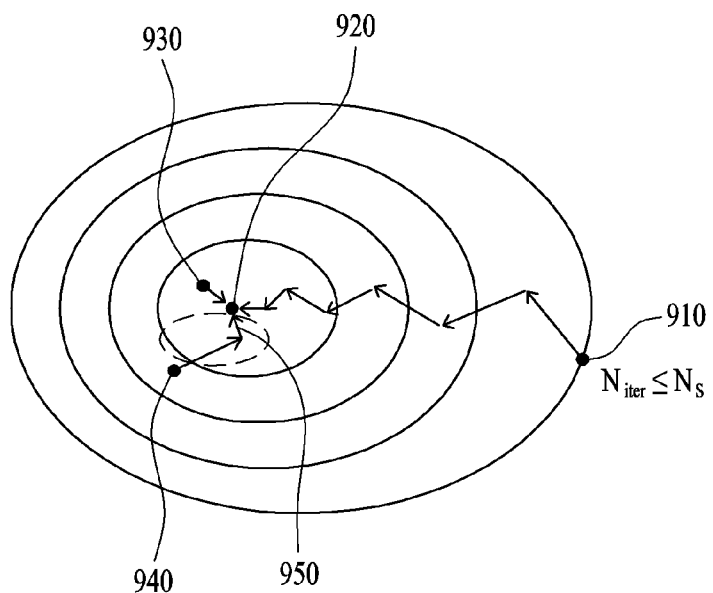
FIG. 9 is a diagram showing the concept of a process of detecting a detection signal at a MIMO receiver related to the present invention.
Figure 10:
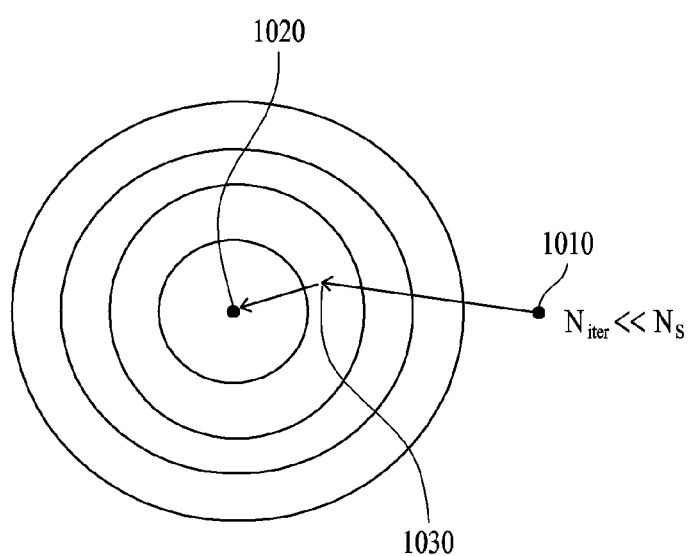
FIG. 10 is a diagram showing the concept of a process of detecting a detection signal at a MIMO receiver related to the present invention.

FIGS. 9 and 10 are diagrams showing the concept of a process of detecting a detection signal at a MIMO receiver using a preprocessing filter. FIG. 9 shows a process of detecting a detection signal of a MIMO receiver operating according to a method of sharing a received signal detector (or a reception filter) and FIG. 10 is a process of detecting a detection signal of a MIMO receiver operating according to a method of sharing the above-described preprocessing filter. In FIGS. 9 and 10, an arrow means an iterative computation process of a numerical analysis algorithm.

First, in FIG. 9, the center 920 of circles means a desired value, that is, an accurate value, of the MIMO receiver. If a detection value is slightly different from the accurate value (910), the numerical analysis algorithm may reach the accurate value (920) through several iterative processes. In contrast, if a detection signal is relatively close to the accurate value (930 and 940), the accurate value (920) can be found with a smaller iteration number (950). Accordingly, the MIMO receiver operating according to the reception filter sharing method operates to share the reception filter such that the initial value of the detection signal becomes close to the accurate value (that is, an error decreases).

In contrast, in FIG. 10, the MIMO receiver operating according to the preprocessing filter sharing method operates to decrease the iteration number instead of enabling the initial value of the detection signal to become close to the desired value (that is, the center 1020 of the circles). That is, the MIMO receiver according to the proposed method can find the desired value with a relatively smaller iteration number (1030) as compared to FIG. 9 even when an initial value significantly different from the desired value 1020 of the numerical analysis algorithm is computed (1010). In other words, in FIG. 10, the MIMO receiver operates to rapidly increase the convergence speed according to the iterative computation of the numerical analysis algorithm so as to decrease complexity.

Hereinafter, an embodiment in which such a MIMO receiver generates the preprocessing filter $v_1$ will be described in detail.

According to a first embodiment, the preprocessing filter may be generated by various algorithms such as a Jacobi method, a Gauss-Siedel method, an SQR preconditioning method and an incomplete Cholesky factorization method.

First, an arbitrary matrix $A_1$ may be defined based on the MIMO channel of the reference RE (first RE) as shown in Equation 4 below.

$$A_1 = G_1^\dagger G_1 + R \qquad \text{Equation 4}$$

Since the matrix $A_1$ is a positive definite matrix and is symmetric, Equation 4 may be factorized as shown in Equation 5 below.

$$A_1 = L_1 + D_1 + L_1^H \qquad \text{Equation 5}$$

In Equation 5, $L_1$ denotes a lower triangular matrix and $D_1$ denotes a diagonal matrix. In Equation 5, the preprocessing filter $V_1$ according to three methods among the above-described various methods may be defined.

Jacob method: $V_1 = D_1^{-1}$
Gauss-Siedel method: $V_1 = (L_1 + D_1)^{-1}$
SQR preconditioning method: $V_1 = w(L_1 + wD_1)^{-1}$ (w is an arbitrary constant)

Among the above-described methods, the Gauss-Siedel method and the SQR preconditioning method may clearly express the preprocessing filter $V_1$ by computing an actual inverse matrix. However, in order to reduce computational complexity for obtaining the inverse matrix, $V_1$ may be computed through a back substitution process according to Equation 6 below, without accurately computing $V_1$.

$$x = V^{-1}y \rightarrow Vx = y \qquad \text{Equation 6}$$

In Equation 6, if V is a lower triangular matrix, x which is the value of Equation 6 may be sequentially computed from the right equation of Equation 6.

In addition to the above-described three methods, if the incomplete Cholesky factorization method is applied, $A_1$ of Equation 5 may be factorized to an incomplete Cholesky factor $\hat{L}_1$, as shown in Equation 7 below. $\hat{L}_1$ is a lower triangular matrix.

$$A_1 \approx \hat{L}_1 \hat{L}_1^H \qquad \text{Equation 7}$$

Although the incomplete Cholesky factorization method may factorize $A_1$ with complexity less than that of the complete Cholesky factorization method, an approximated lower triangular matrix is defined. In the incomplete Cholesky factorization method, the preprocessing filter $V_1$ is defined as Equation 8 below.

$$V_1 = (\hat{L}_1^H)^{-1} \hat{L}_1^{-1} \qquad \text{Equation 8}$$

The preprocessing filter $V_1$ according to Equation 8 may be accurately expressed by directly computing an inverse matrix or may be computed and expressed by a back substitution process.

The preprocessing filter $V_1$ according to the embodiment of the present invention may be computed and defined according to various methods in addition to the above-described methods. For example, various methods and algorithms disclosed in "Iterative Methods for Sparse Linear Systems" may be used for the process of computing the preprocessing filter $V_1$.

As a second embodiment of generating the preprocessing filter, the preprocessing filter $V_1$ may be generated using the properties of the MIMO channel of the RE. In order to compute $A_1$ according to the above-described first embodiment, a matrix X matrix operation process $G_1^\dagger G_1$ is required. In order to improve computational complexity of such an operation process, in the second embodiment, the MIMO channel of the RE is used to compute $A_1$ with low complexity.

More specifically, in the reference RE, $G_1^\dagger G_1$ may be approximated to a diagonal matrix $Z_1$ of Equation 9 below.

$$Z_1 \triangleq \begin{bmatrix} g_1^H g_1 & 0 & \cdots & 0 \\ 0 & g_2^H g_2 & \ddots & \vdots \\ \vdots & \ddots & \ddots & 0 \\ 0 & \cdots & 0 & g_{N_s}^H g_{N_s} \end{bmatrix} \approx G_1^\dagger G_1 \qquad \text{Equation 9}$$

$$G_1 = [\, g_1 \ \ g_2 \ \cdots \ g_{N_s} \,]$$

Approximation of Equation 9 becomes accurate when the number $N_s$ of streams increases and correlation between channel elements decreases. In such approximation, off-diagonal terms may be approximated to 0 according to the properties of the channel in the massive MIMO environment. According to the above-described approximation process, the matrix $A_1$ may be defined by the diagonal matrix of Equation 10.

$$A_1 = Z_1 + R \qquad \text{Equation 10}$$

Subsequently, since $A_1$ of Equation 10 may be expressed only by diagonal elements, the Jacobi method described in the first embodiment is applicable to $A_1$ of Equation 10 to compute the preprocessing filter $V_1$. In the second embodiment, if an error is large in the approximation process, the decrement of the iteration number of the numerical analysis algorithm may not be large. That is, the speed of converging on the desired value may not increase.

Figure 11:
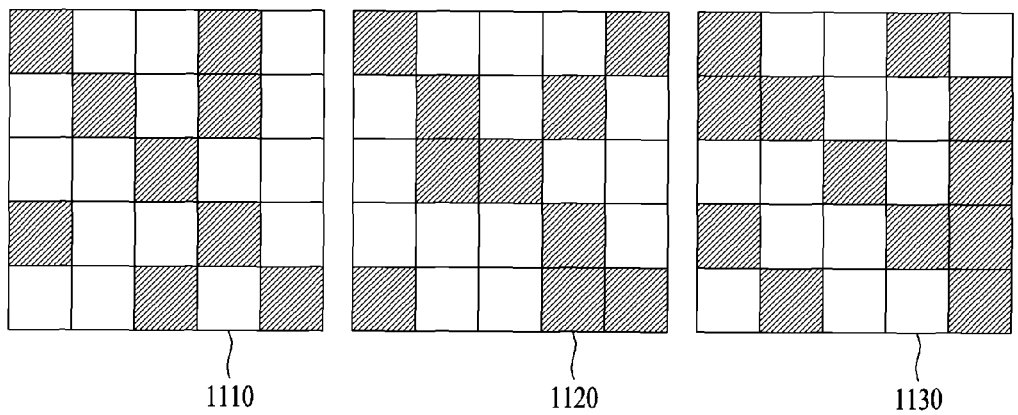
FIG. 11 is a diagram showing an example of generating a preprocessing filter at a MIMO receiver related to the present invention.

Subsequently, a third embodiment of generating a preprocessing filter will be described with reference to FIG. 11. FIG. 11 is a diagram showing an example of generating a preprocessing filter at a MIMO receiver in relation to the present invention.

In the third embodiment, $Z_1$ having a small difference from $G_1 G_1^\dagger$ of the first embodiment is found and the method proposed in the second embodiment is used. For example, if the MIMO channel matrix $G_1$ is approximated to a matrix $\tilde{G}_1$ having shapes 1110, 1120 and 1130 shown in FIG. 11, it is possible to significantly reduce computational complexity of $A_1$. In FIG. 11, a black element indicates a non-zero value and a white element indicates a zero value. That is, the value of each element of the channel matrix is compared with a predetermined threshold to approximate the value of the element less than the threshold to 0. At this time, the rank of the approximated $\tilde{G}_1$ should be equal to $G_1$.

The three embodiments of computing the preprocessing filter $V_1$ have been described above. Hereinafter, a numerical analysis algorithm for detecting a detection signal using a preprocessing filter will be described.

The numerical analysis algorithm replaces inverse matrix operation of MMSE, zero forcing (ZF), interference rejection combining (IRC), and BLAST algorithms for detecting and generating detection signals with respect to an RE group. The proposed numerical analysis algorithm is applicable to all MIMO receivers described in TR 36.866 for NAIC v1.1.0. Such a numerical analysis algorithm replaces only the above-described inverse matrix operation and thus has detection performance equal or similar to that of the conventional MIMO receiver while improving complexity.

As the numerical analysis algorithm, a conjugate gradient (CG) algorithm, a Newton method algorithm or a steepest descent method algorithm may be used. In the numerical analysis algorithm, a value is calculated with a small iteration number (that is, at a high speed) using the above-described preprocessing filter $V_1$ and the effect of reducing the iteration number increases as correlation between a reference RE for generating a preprocessing filter and another RE increases.

For example, using FIG. 8 and the CG algorithm, the numerical analysis algorithm will be described in detail. The CG algorithm is a converging algorithm for iteratively performing an operation until predetermined accuracy is derived. As the algorithm is iterated, a result having a smaller error is derived.

First, a MIMO receiver groups a plurality of REs having correlation equal to or greater than a predetermined value to form one RE group shown in FIG. 6. Any one RE included in the RE group becomes a reference RE (first RE) and the MIMO receiver generates a preprocessing filter using the MIMO channel of the reference RE. Although the reference RE of the RE group may be closest to the center on the time/frequency axis, the present invention is not limited thereto.

The MIMO receiver generates detection signals $\hat{s}_l$ with respect to the other REs of the RE group using the numerical analysis algorithm (CG algorithm) based on the preprocessing filter $V_1$ of the reference RE. The CG algorithm may be implemented in the form of Equation 11 below.

$$\begin{aligned}
&\hat{s}^{(0)} = I_{N_S \times 1} \\
&t = G_I^H G_I \hat{s}^{(0)} + R \hat{s}^{(0)} \\
&b = G_I^H y_I \\
&g^{(0)} = b - t \\
&d^{(0)} = V_1 g^{(0)} \\
&\text{while } \|g^{(i)}\| > \delta \|g^{(0)}\| \text{ do} \\
&\quad t = (g^{(i)})^\dagger V_1 g^{(i)} \\
&\quad t = G_I^H G_I d^{(i)} + R d^{(i)} \\
&\quad \alpha^{(i)} = \frac{t}{(d^{(i)})^\dagger t} \\
&\quad \hat{s}^{(i+1)} = \hat{s}^{(i)} + \alpha^{(i)} d^{(i)} \\
&\quad g^{(i+1)} = g^{(i)} - \alpha^{(i)} t \\
&\quad \beta^{(i+1)} = \frac{(g^{(i+1)})^\dagger V_1 g^{(i+1)}}{t} \\
&\quad d^{(i+1)} = V_1 g^{(i+1)} + \beta^{(i+1)} d^{(i)} \\
&\text{end while} \\
&\hat{s}_l = \hat{s}^{(end)}
\end{aligned} \quad \text{Equation 11}$$

In Equation 11, $\hat{s}^{(i)}$ is an estimated transmission signal in i-th iteration of the numerical analysis algorithm. The transmission signal of the $0^{th}$ iteration, that is, an initial value $\hat{s}^{(0)}$, is set to a vector composed of all entries of 1. $\hat{g}^{(i)}$, $\hat{d}^{(i)}$ and $b^{(i)}$ denote temporary vectors for obtaining a value and $f_1$, $f_2$ denote functions for determining a relation between the temporary vectors. The vector $\hat{g}^{(i)}$ is a gradient vector and indicates a fastest direction in which the iterative algorithm converges on an accurate value. At this time, if a difference between the updated vector $g^{(i)}$ and the initially generated vector $g^{(0)}$ is less than a predetermined threshold, algorithm iteration is stopped. That is, through the size of the vector $\hat{g}^{(i)}$, a difference between a result obtained by directly calculating a MMSE filter and) a secondary signal may be indirectly confirmed. If the $g^{(i)}$ value is 0, a difference between the secondary signal and the result obtained using the MMSE is 0.

In Equation 11, $\delta$ determines an end time of the algorithm and may mean target accuracy of the algorithm. $\delta$ may be automatically determined by a system or may be determined according to user input. As $\delta$ decreases, an algorithm iteration number increases and the accuracy of a result increases and, as $\delta$ increases, an algorithm iteration number decreases and the accuracy of a result decreases. That is, an allowable error between a value obtained using the CG algorithm and a value obtained using the MMSE filter is determined according to the level of $\delta$. The MIMO receiver may control $\delta$ to provide trade-off between complexity and performance. Meanwhile, in the CG algorithm, if an iteration number becomes equal to the size of a square matrix, a value obtained through the CG algorithm and a value obtained using the MMSE filter become equal to each other.

According to one embodiment, the MIMO receiver may restrict the iteration number of the numerical analysis algorithm to restrict a maximum time required to detect the detection signal. If a time required for the MIMO receiver to detect the signal of a specific RE is relatively greater than a time required to detect the signal of another RE, the total processing time of the system is influenced. In order to prevent such a problem, the time required to detect the detection signal may be restricted to a specific range.

The detection signal may be restricted by restricting the iteration number of the numerical analysis algorithm. That is, since a time required for iteration of the numerical analysis algorithm is constant, the MIMO receiver may control an iteration time by restricting the iteration number. Restricting the iteration number may increase an error between the value obtained through the CG algorithm and the value obtained using the MMSE filter. There is a trade-off between performance deterioration and a processing time.

Figure 12:
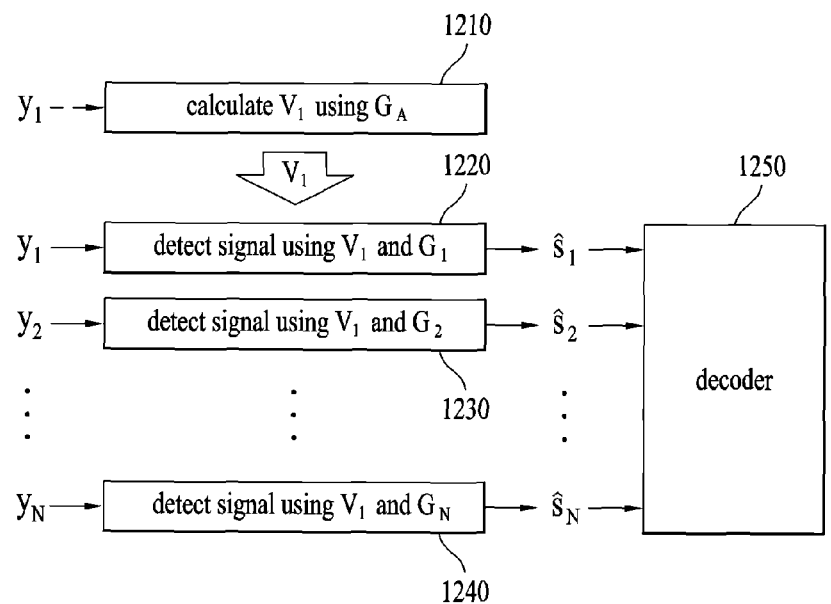
FIG. 12 is a diagram showing another MIMO receiver operational process related to the present invention.

FIG. 12 is a diagram showing a MIMO receiver operational process of another embodiment using a preprocessing filter. In FIG. 12, another embodiment of generating a preprocessing filter $V_1$ will be described.

In FIG. 12, the preprocessing filter $V_1$ is computed using the channels of all of the REs of the RE group. For example, $V_1$ may be generated based on $G_A$ computed in Equation 12 below.

$$G_A = \frac{1}{N}\sum_{l=1}^{N} w_l G_l \qquad \text{Equation 12}$$

In Equation 12, N denotes the number of REs in the RE group and $w_l$ denotes a weight of each channel matrix. In the case of $w_l=1$, $G_A$ is defined as an average of all channel matrices. The MIMO receiver computes the preprocessing filter $V_1$ to be shared in the RE group based on the channel matrix $G_A$ computed in Equation 12 (1210). Subsequently, the MIMO receiver detects the detection signal of each RE using the preprocessing filter $V_1$ (1220, 1230 and 1240).

The embodiment in which the MIMO receiver generates the preprocessing filter $V_1$ and the embodiment in which the detection signal is generated using $V_1$ have been described with reference to FIGS. 8 to 12. Hereinafter, an embodiment in which a reception filter is shared in an RE group will be described with reference to FIGS. 13 to 15, in addition to an embodiment in which a preprocessing filter is shared in an RE group.

Figure 13:
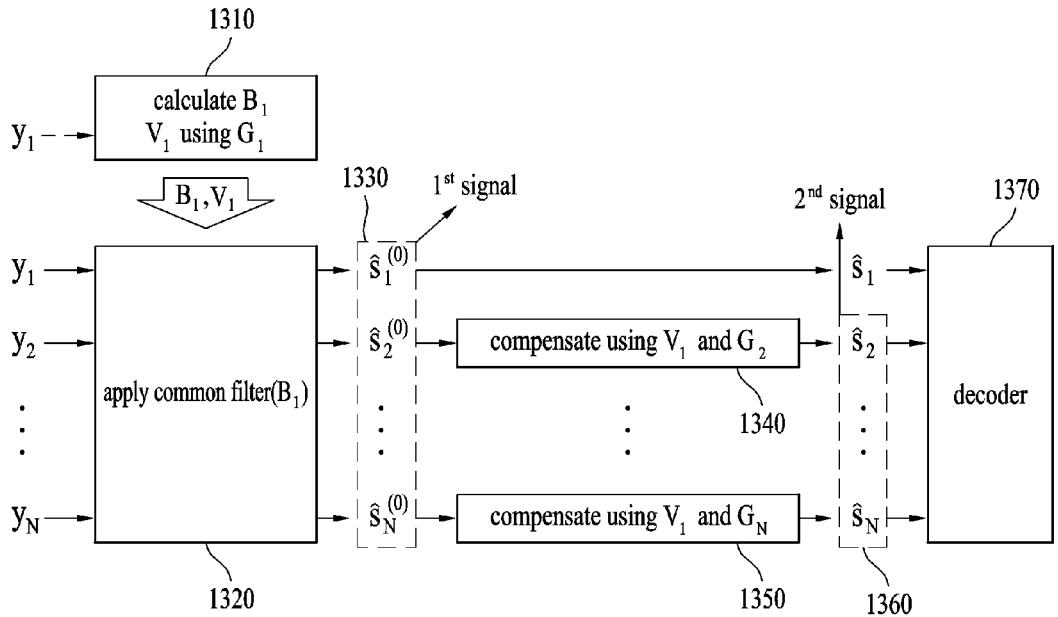
FIG. 13 is a diagram showing another MIMO receiver operational process related to the present invention.

FIG. 13 is a diagram showing a MIMO receiver operational process of another embodiment using a preprocessing filter. In FIG. 13, unlike FIG. 8, the MIMO receiver generates a preprocessing filter $V_1$ and a reception filter $B_1$ based on a channel $G_1$ of a reference RE of an RE group (1310). $V_1$ and $B_1$ are shared among all of the REs of the RE group and the MIMO receiver detects a primary signal from a received signal using the reception filter $B_1$ (1320 and 1330). Subsequently, the MIMO receiver detects a secondary signal through a process of compensating for the primary signal using the preprocessing filter $V_1$ and the numerical analysis algorithm based on a unique channel of each RE (1340, 1350 and 1360).

The above-described process will be described in detail with reference to Equation 13 below.

$$\begin{aligned}
&b = G_l^H y_l \\
&\hat{s}^{(0)} = B_1 b \\
&t = G_l^H G_l \hat{s}^{(0)} + R\hat{s}^{(0)} \\
&g^{(0)} = b - t \\
&d^{(0)} = V_1 g^{(0)} \\
&\text{while } \|g^{(i)}\| > \delta \|g^{(0)}\| \text{ do} \\
&\quad t = (g^{(i)})^\dagger V_1 g^{(i)} \\
&\quad t = G_l^H G_l d^{(i)} + R d^{(i)} \\
&\quad \alpha^{(i)} = \frac{t}{(d^{(i)})^\dagger t} \\
&\quad \hat{s}^{(i+1)} = \hat{s}^{(i)} + \alpha^{(i)} d^{(i)} \\
&\quad g^{(i+1)} = g^{(i)} - \alpha^{(i)} t \\
&\quad \beta^{(i+1)} = \frac{(g^{(i+1)})^\dagger V_1 g^{(i+1)}}{t} \\
&\quad d^{(i+1)} = V_1 g^{(i+1)} + \beta^{(i+1)} d^{(i)} \\
&\text{end while} \\
&\hat{s}_l = \hat{s}^{(end)}
\end{aligned} \qquad \text{Equation 13}$$

In Equation 13, $\hat{s}_l^{(0)}$ denotes a primary signal detected from the received signal of an l-th RE using the reception filter $B_1$ generated based on the channel of the reference RE. The numerical analysis algorithm of Equation 13 compensates for the primary signal using the preprocessing filter $V_1$ generated from the reference RE to generate the secondary signal $\hat{s}_l$. If correlation between the reference RE and another RE of the RE group is large, the primary signal detected using the common reception filter $B_1$ is similar to a value directly obtained using the MMSE filter and the process of, at the numerical analysis algorithm, compensating for the primary signal using the preprocessing filter $V_1$ to detect the secondary signal is more rapidly performed. In contrast, if correlation is small, an error between the primary signal and the value directly obtained using the MMSE filter is large and the process of detecting the secondary signal is little different from that of the case where the preprocessing filter is not used.

Hereinafter, an embodiment of obtaining the preprocessing filter $V_1$ in the embodiment of FIG. 13 will be described. In FIG. 13, unlike FIG. 8, since the common reception filter $B_1$ shared in the RE group is computed, the process of computing the preprocessing filter $V_1$ may be different from the process of FIG. 8.

First, an arbitrary matrix $A_1$ is defined based on the channel of the reference RE as shown in Equation 14.

$$A_1 = G_1^H G_1 + R \qquad \text{Equation 14}$$

In Equation 14, $A_1$ has an inverse matrix relation $B_1 = A_1^{-1}$ with the common reception filter $B_1$. The MIMO receiver may define the preprocessing filter $V_1$ based on the matrix $A_1$ according to the following three embodiments.

First, the preprocessing filter $V_1$ may be the inverse matrix of the common reception filter $B_1$. That is, the common reception filter $B_1$ may be the preprocessing filter $V_1$. This embodiment is expressed as shown in Equation 15 and, if the common reception filter $B_1$ is computed, the MIMO receiver uses the common reception filter $B_1$ as the preprocessing filter. Since the common reception filter and the preprocessing filter are the same, the MIMO receiver does not need to further compute $V_1$ and does not require a memory used to compute and store $V_1$.

$$V_1 = A_1^{-1} = B_1 \qquad \text{Equation 15}$$

Second, the MIMO receiver may factorize $A_1$ according to the complete Cholesky factorization method to compute the preprocessing filter $V_1$. Such a process is performed through three steps according to the following order.

i) $A_1 = L_1 L_1^H$ ($L_1$ is a lower triangular matrix)
ii) $B_1 = (L_1^H)^{-1} L_1^{-1}$
iii) $V_1 = (\hat{L}_1^H)^{-1} \hat{L}_1^{-1}$, $\hat{L}_1 \approx L_1$ If a back substitution process is used, the process of obtaining the inverse matrix of the lower triangular matrix $L_1$ in step ii) may be omitted. That is, in the second method, when applying $B_1$ and $V_1$, complexity can be reduced using the back substitution process.

In this case, the main complexity of the process of generating the preprocessing filter $V_1$ and the common reception filter $B_1$ occurs in step i).

Step iii) is a step of generating a sparse preprocessing filter (a matrix, the most elements of which are 0) through approximation of $\hat{L}_1 \approx L_1$. In such a process, if the preprocessing filter is a sparse filter, computational complexity is significantly reduced per iteration of the numerical analysis algorithm.

In a third method, the preprocessing filter $V_1$ may be computed according to the incomplete Cholesky factorization method. Such a process is performed through three steps according to the following order.

i) $A_1 \approx \hat{L}_1 \hat{L}_1^H$ ($\hat{L}_1$ is a lower triangular matrix)
ii) $B_1 = (\hat{L}_1^H)^{-1} \hat{L}_1^{-1}$
iii) $V_1 = (\hat{L}_1^H)^{-1} \hat{L}_1^{-1}$ In the second embodiment, the main complexity of the process of generating the preprocessing filter $V_1$ and the common reception filter $B_1$ occurs in step i). Accordingly, in the third embodiment, instead of using the complete Cholesky factorization in step i), $\hat{L}_1$ is computed using incomplete Cholesky factorization.

If the preprocessing filter $V_1$ and the common reception filter $B_1$ are computed based on $\hat{L}_1$, unlike the second embodiment, even the secondary signal of the reference RE should be computed through the compensation process. This is because $B_1$ is an approximated inverse matrix and thus an error may occur in the reference RE. As a result, the third embodiment requires lowest complexity upon generating the common reception filter and the preprocessing filter but requires a largest iteration number in the compensation process.

The above-described embodiments are merely exemplary and the preprocessing filter and the common reception filter may be defined according to various methods, in addition to the above-described methods.

Unlike the embodiment described with reference to FIG. 13, the compensation process 1340 and 13450 using the unique channel of the RE and the preprocessing filter may be omitted according to channel correlation between REs. That is, if correlation between the reference RE and another RE is sufficiently large, the error of the primary signal detected using the common reception filter $B_1$ is relatively small. If influence of the error of the primary signal of the RE on performance of a final result is predicted to be low, the process of compensating for the primary signal is omitted and the primary signal is immediately input to a decoder 1370. That is, it is possible to reduce computational complexity and memory requirements necessary for the compensation process.

Figure 14:
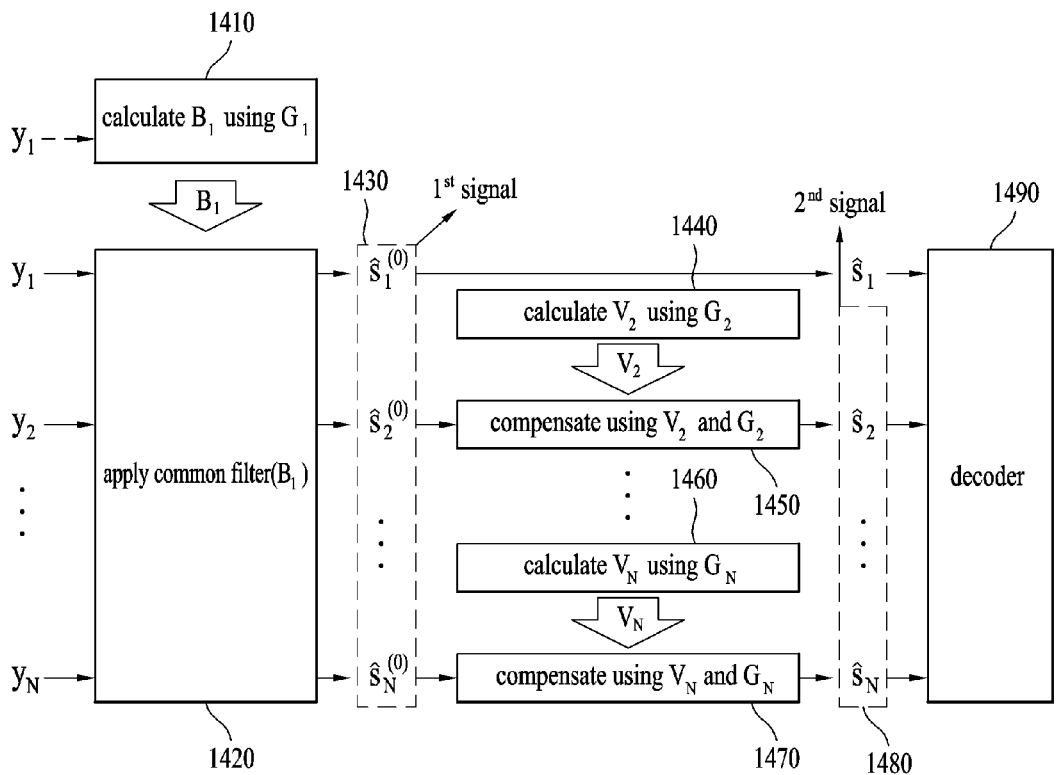
FIG. 14 is a diagram showing another MIMO receiver operational process related to the present invention.

FIG. 14 is a diagram showing another MIMO receiver operational process using a preprocessing filter. FIG. 14 is similar to FIG. 13 in that the common reception filter $B_1$ is used. However, in the embodiment of FIG. 14, the preprocessing filter $V_1$ is not computed based on the channel of the reference RE but the preprocessing filter of each RE is computed using the unique channel of each RE of the RE group. The process of compensating for the primary signal is performed using the preprocessing filter generated based on the unique channel of each RE instead of $V_1$.

More specifically, the MIMO receiver computes the common reception filter $B_1$ based on the channel of the reference RE (1410). $B_1$ is shared among the REs of the RE group and is used to generate the primary signal (1430). Prior to the process of compensating for the primary signal, the MIMO receiver generates a preprocessing filter based on the unique channel of each RE (1440 and 1460). That is, $V_2$ is computed based on $G_2$ with respect to a second RE (1440) and $V_N$ is computed based on $G_N$ with respect to an N-th RE.

The embodiments described with reference to FIGS. 8 to 13 are applicable to the process of the unique preprocessing filter of each RE. Subsequently, the MIMO receiver performs the compensation process based on the numerical analysis algorithm using the unique preprocessing filter generated with respect to each RE (1450 and 1470). The secondary signal generated through the compensation process (1480) is input to and processed in the decoder 1490.

According to the embodiment of FIG. 14, since the preprocessing filter is generated per RE, additional complexity is required. However, if channel correlation between REs is low, the iteration number of the compensation process increases in the embodiment in which the preprocessing filter is shared according to the methods of FIGS. 8 to 13. The embodiment in which the unique preprocessing filter is used as shown in FIG. 14 is more efficient at reducing complexity and a time required for a computational process.

Further, if the preprocessing filter is generated according to the Jacobi method, the Gauss-Siedel method and the SQR preconditioning method assuming the back substitution process, complexity increased in the process of computing the preprocessing filer is minimized and a large burden is not imposed on the MIMO receiver. If the lower triangular matrix having a size of N is subjected to the back substitution process, complexity is less than $N^2$.

Figure 15:
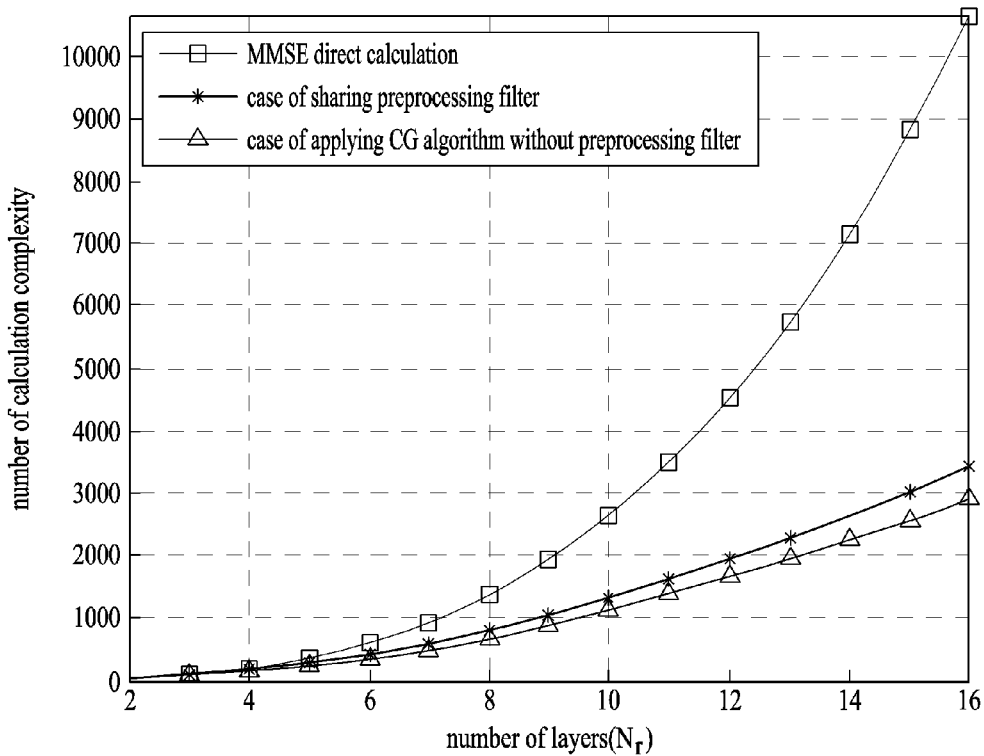
FIG. 15 is a graph showing comparison between computational complexities of signal detection processes related to the present invention.

FIG. 15 is a graph showing comparison between computational complexities of the prior art and the case of applying the preprocessing filter.

In the graph of FIG. 15, a curve denoted by a rectangle shows computational complexity when signals are detected with respect to all of the REs of the RE group using respective MMSE filters. A curve denoted by a star shows the case where the preprocessing filter $V_1$ is shared in the RE group and a curve denoted by a triangle shows the case in which $V_1$ is not shared in the RE group and the common reception filter $B_1$ is shared to perform the compensation process. In FIG. 15, it can be seen that the above-proposed MIMO receiver has higher complexity gain as the number of received streams increases.

According to the above-described embodiments, if correlation among all of the REs of the RE group is 1, the reception filter $B_I$ of each RE becomes equal to the reception filter $B_1$ of the reference RE. Accordingly, even when only $B_1$ is used, the primary signal may be input to the decoder without performance deterioration. Therefore, since only one reception filter is obtained with respect to the RE group, the total computational complexity is reduced to 1/N (N being the number of REs of the RE group).

If correlation among the REs of the RE group is less than 1, the error of the primary signal computed using the common reception filter $B_1$ is compensated for using the preprocessing filter $V_1$. As correlation between the REs increases, the compensation process of the numerical analysis algorithm using the preprocessing filter is rapidly performed (that is, the iteration number decreases). At this time, the compensation process using the preprocessing filter has higher computational complexity than the compensation process without the preprocessing filter but has a significantly lower iteration number than the compensation process without the preprocessing filter. As a result, the proposed MIMO receiver makes the best of the correlation between the REs, thereby reducing complexity while minimizing performance deterioration.

The MIMO receiver can further reduce computational complexity at the sacrifice of performance deterioration due to an error in the compensation process using the preprocessing filter, thereby providing a trade-off between computational complexity and performance.

In addition, according to the proposed method, the inverse matrix is not directly computed with respect to the REs except for the reference RE and all operations are performed by a matrix X vector operation. A distributed processing method is not easily applicable to the inverse matrix operation, but is easily applicable to the matrix X vector operation due to easy parallelization. Therefore, overall processing time can be rapidly reduced.

3. Proposed Method of Operating MIMO Receiver

The process of, at the MIMO receiver, applying the preprocessing filter to process the received signal has been described above. Hereinafter, a process of, at the MIMO receiver, processing the received signal using a covariance matrix for the RE group will be described.

In the proposed embodiment, the MIMO receiver generates a covariance matrix based on channel information of the REs included in the RE group. Covariance matrices are generated with respect to the REs except for the reference RE included in the RE group such that each RE has a unique covariance matrix.

More specifically, the covariance matrix of the RE group is defined as shown in Equation 16 below. In Equation 16, l means an l-th RE of the RE group.

$$U_l = G_l^H G_l + R \quad \text{Equation 16}$$

In Equation 16, $G_l$ means an estimated channel of the l-th RE and R means an interference element of the covariance matrix. Hereinafter, a process of, at the MIMO receiver, generating a detection signal from a received signal using the covariance matrix of Equation 16 will be described.

In FIG. 8 and Equation 11, the MIMO receiver compensates for the received signal using the preprocessing filter $V_1$ and the numerical analysis algorithm (CG algorithm) to generate the detection signal of each RE of the RE group. In addition, in FIG. 13 and Equation 13, the MIMO receiver applies the numerical analysis algorithm to the preprocessing filter $V_1$ and the reception filter $B_1$ to generate the detection signal. Equations 11 and 13 may be expressed by Equation 17 below.

$$\begin{aligned}
&b = G_l^H y_l \\
&\hat{s}^{(0)} = I_{N_s \times 1} \text{ or } \hat{s}^{(0)} = B_1 b \\
&t = G_l^H G_l \hat{s}^{(0)} + R\hat{s}^{(0)} \\
&g^{(0)} = b - t \\
&d^{(0)} = V_1 g^{(0)} \\
&\text{while } \|g^{(i)}\| > \delta\|g^{(0)}\| \text{ do} \\
&\quad t = (g^{(i)})^\dagger V_1 g^{(i)} \\
&\quad t = G_l^H G_l d^{(i)} + R_d(i) \\
&\quad \alpha^{(i)} = \frac{t}{(d^{(i)})^\dagger t} \\
&\quad \hat{s}^{(i+1)} = \hat{s}^{(i)} + \alpha^{(i)} d^{(i)} \\
&\quad g^{(i+1)} = g^{(i)} - \alpha^{(i)} t \\
&\quad \beta^{(i+1)} = \frac{(g^{(i+1)})^\dagger V_1 g^{(i+1)}}{t} \\
&\quad d^{(i+1)} = V_1 g^{(i+1)} + \beta^{(i+1)} d^{(i)} \\
&\text{end while} \\
&\hat{s}_l = \hat{s}^{(end)}
\end{aligned} \quad \text{Equation 17}$$

In Equation 17, $\hat{s}^{(0)} = I_{N_s \times 1}$ indicates the case where the embodiment of Equation 11 is applied and $\hat{s}^{(0)} = B_1 b$ indicates the case where the embodiment of Equation 13 is applied. Unlike Equation 11, in the embodiment of Equation 13, the primary signal is generated using the reception filter and then is compensated for to generate the secondary signal (that is, the detection signal). If the detection signal is generated according to the algorithm of Equation 17, the MIMO receiver computes the MIMO channel in the multiplication form of a matrix and a vector in a process of computing $t = G_l^H G_l \hat{s}^{(0)} + R\hat{s}^{(0)}$, and complexity of this computation is $2N_r N_s + N_s^2$.

Equation 18 below shows a numerical analysis algorithm (CG algorithm) in a process of, at the MIMO receiver, processing a received signal using a covariance matrix.

$$\begin{aligned}
&b = G_l^H y_l \\
&\hat{s}^{(0)} = I_{N_s \times 1} \text{ or } \hat{s}^{(0)} = B_1 b \\
&U_l = G_l^H G_l + R \\
&t = U_l \hat{s}^{(0)} \\
&g^{(0)} = b - t \\
&d^{(0)} = V_1 g^{(0)} \\
&\text{while } \|g^{(i)}\| > \delta\|g^{(0)}\| \text{ do} \\
&\quad t = (g^{(i)})^\dagger V_1 g^{(i)} \\
&\quad t = U_l d^{(i)} \\
&\quad \alpha^{(i)} = \frac{t}{(d^{(i)})^\dagger t} \\
&\quad \hat{s}^{(i+1)} = \hat{s}^{(i)} + \alpha^{(i)} d^{(i)} \\
&\quad g^{(i+1)} = g^{(i)} - \alpha^{(i)} t \\
&\quad \beta^{(i+1)} = \frac{(g^{(i+1)})^\dagger V_1 g^{(i+1)}}{t} \\
&\quad d^{(i+1)} = V_1 g^{(i+1)} + \beta^{(i+1)} d^{(i)} \\
&\text{end while} \\
&\hat{s}_l = \hat{s}^{(end)}
\end{aligned} \quad \text{Equation 18}$$

Unlike Equation 17, a process of defining a covariance matrix is added to the numerical analysis algorithm of Equation 18 through computation of $U_l = G_l^H G_l + R$ and $t = U_l \hat{s}^{(0)}$ is computed through the computed covariance matrix. In Equation 17, t is computed through $t = G_l^H G_l \hat{s}^{(0)} + R\hat{s}^{(0)}$ as described above.

If the detection signal is generated according to Equation 18, the computational complexity of $U_l = G_l^H G_l + R$ is $(N_r N_s^2 + N_r N_s)/2$ and the computational complexity of $t = U_l \hat{s}^{(0)}$ is $N_s^2$. That is, the computational complexity of the case where the covariance matrix is generated to generate the detection signal in Equation 18 is higher than $2N_r N_s + N_s^2$ which is the computational complexity described with reference to Equation 17.

However, the covariance matrix of Equation 18 is initially generated only once in the computation process of the numerical analysis algorithm. That is, if the MIMO receiver iteratively performs the numerical analysis algorithm in order to generate the detection signal, the computational complexity of Equation 18 increases in proportion to $t = U_l d^{(i)}$. In contrast, computational complexity of Equation 17 increases in proportion to $t = G_l^H G_l \hat{s}^{(0)} + R\hat{s}^{(0)}$. Equation 19 below shows comparison between computational complexities of the two methods.

$$\begin{aligned}
Cpx_{withoutU} = &\quad \text{Equation 19} \\
&3N_s^2 + 5N_s N_r + \frac{5}{2}N_s + (iter-1)\left(N_r N_s^2 + N_r N_s + \frac{7}{2}N_s\right) \\
Cpx_{withU} = &\frac{1}{2}N_s N_r(N_s+3) + 4N_s^2 + \\
&\frac{5}{2}N_s + (iter-1)\left(N_s^2 + \frac{7}{2}N_s\right)
\end{aligned}$$

Figure 19:
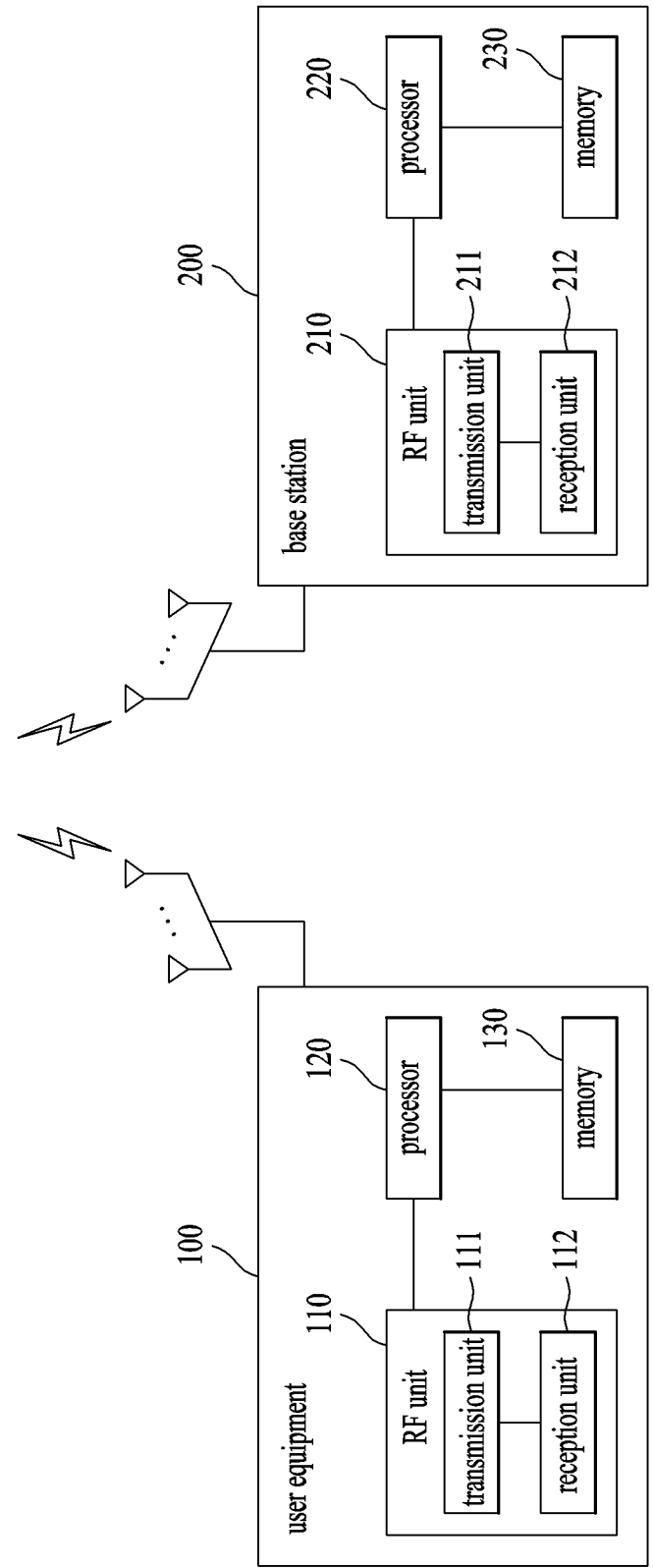
FIG. 19 is a block diagram showing the configuration of a UE and a base station according to one embodiment of the present invention.

In FIG. 19, $Cpx_{without\ U}$ indicates computational complexity of the embodiment of Equation 17 in which the covariance matrix is not used and $Cpx_{with\ U}$ indicates computational complexity of the embodiment of Equation 18 in which the covariance matrix is used.

As a result, as the iteration number of a series of processes of processing the received signal in order to generate the detection signal increases, computational complexity gain increases in the embodiment of Equation 18 in which the covariance matrix is used. Comparison between the computational complexities of the two methods will be described in detail with reference to FIG. 18.

Of course, when the MIMO receiver generates the detection signal according to Equation 18, an additional memory for generating a covariance matrix $U_I$ is required. The numerical analysis algorithms of Equations 17 and 18 are different in computational complexity and memory requirements but are equal in performance under the same conditions (the number of receive antennas, the number of transmission layers and the iteration number of the algorithm).

Figure 16:
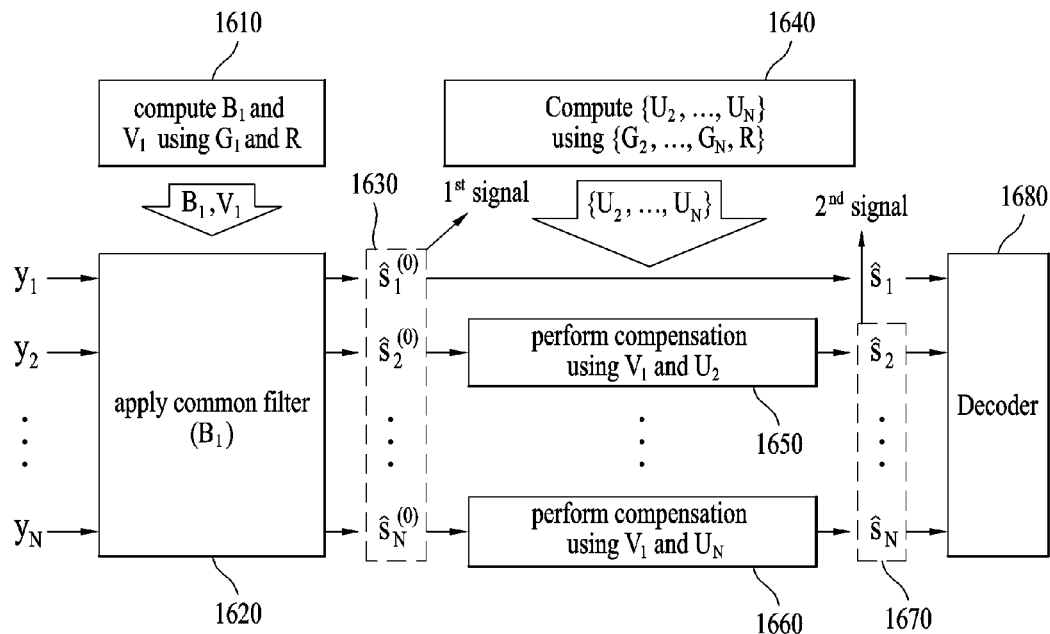
FIG. 16 is a diagram showing another MIMO receiver operational process related to the present invention.

Hereinafter, the operational process of the MIMO receiver using the covariance matrix of the RE group described in Equations 16 and 18 will be described with reference to FIGS. 16 to 18. FIG. 16 shows an operational process of a MIMO receiver according to an embodiment of the present invention.

First, the MIMO receiver generates a preprocessing filter $V_1$ and a reception filter $B_1$ based on interference R and a channel $G_1$ measured with respect to a reference RE of an RE group (1610). $V_1$ and $B_1$ are shared among all of the REs of the RE group and the MIMO receiver detects a primary signal from the received signal using the reception filter $B_1$ (1620 and 1630).

The MIMO receiver generates covariance matrices $U_2, \ldots, U_N$ of the other REs of the RE group based on the channels $G_2, \ldots, G_N$ and interference measured with respect to the REs of the RE group (1640). The process of computing the covariance matrix is performed only when the case where the covariance matrix is used is more advantageous than the case where the covariance matrix is not used in terms of the computational complexity. That is, the MIMO receiver may generate the covariance matrices only when computational complexity gain is obtained, which will be described in detail with reference to FIG. 18.

Subsequently, the MIMO receiver detects the secondary signal through the process of compensating for the primary signal using the preprocessing filter and the covariance matrix with respect to each RE of the RE group (1650, 1660 and 1670). That is, unlike the embodiment of FIG. 13, the MIMO receiver compensates for each RE using the covariance matrix instead of the channel information of each RE. Since the covariance matrix of each RE is generated using the channel information of each RE, there is no difference in performance with the case where the detection signal is directly computed from the channel information of each RE. Since the covariance matrix is generated before detecting the secondary signal, the MIMO receiver can obtain gain in terms of computational complexity as the iteration number in the process of detecting the secondary signal increases. The secondary signal (1670) generated in the compensation process is input to and processed in the decoder 1680.

In contrast, if the covariance matrix is not used, the MIMO receiver processes the received signal using only the preprocessing filter and the reception filter as described above.

Unlike the embodiment shown in FIG. 16, the MIMO receiver may directly process the received signal using the covariance matrix, without the process of detecting the primary signal using the reception filter. That is, in FIG. 8, the MIMO receiver generates the detection signal from the received signal using the channels of the REs and the preprocessing filter $V_1$. The MIMO receiver of the proposed additional embodiment may generate covariance matrices $U_1, U_2, \ldots, U_N$ based on the channel information of the REs and then apply the covariance matrices to the received signals of the REs instead of the channel information, thereby generating the detection signals. In this embodiment, since the compensation process of the reference RE should be performed, the covariance matrix of the reference RE is generated and the received signal is processed.

Figure 17:
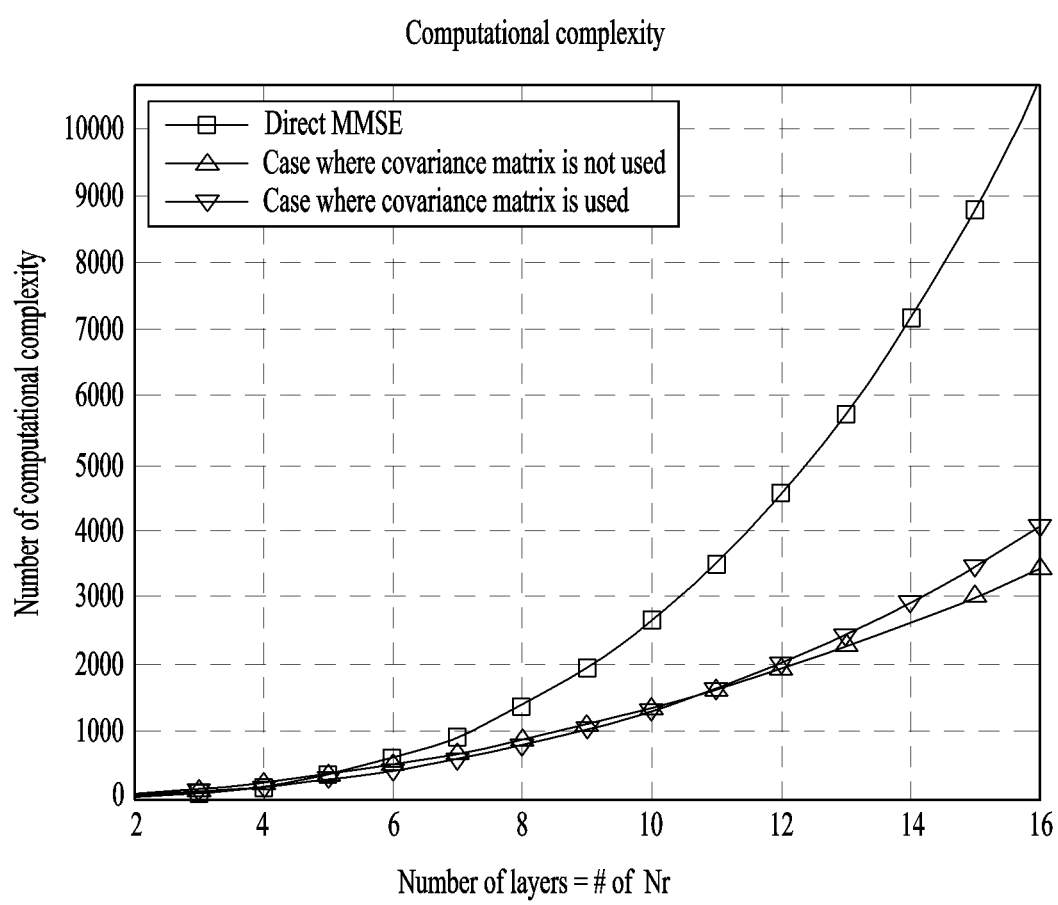
FIG. 17 is a graph showing comparison between computational complexities of a signal detection method of a MIMO receiver according to an embodiment of the present invention.

FIGS. 17 and 18 are a graph and table illustrating computational complexity according to the signal detection method of the MIMO receiver according to the embodiment of the present invention, respectively. The MIMO receiver may selectively determine whether the above-described covariance matrix is used, which will be described in detail with reference to FIGS. 17 and 18.

In the graph of FIG. 17, a line denoted by a triangle indicates computational complexity in the case where the covariance matrix is not used and a line denoted by an inverted triangle indicates computational complexity in the case where the covariance matrix is used. The iteration number of the algorithm is fixed to 2. The lines denoted by the triangle and the inverted triangle are equal in that the reception filter and the preprocessing filter are used and are different in whether the covariance matrix is used or not. In FIG. 17, it can be seen that such two cases can obtain improved computational complexity as compared to the method of processing the received signal using the direct MMSE filter.

The computational complexities of the cases where the covariance matrix is used and is not used were described in Equation 19 and the computational complexity is determined by variables such as the number $N_r$ of receive antennas, the number $N_s$ of reception layers and an algorithm iteration number iter. Such variables are fixed and known to the MIMO receiver. As can be seen from FIG. 17, if the number of receive antennas and reception layers is less than 10, the complexity of the case where the covariance matrix is used (inverted triangle) is lower than that of the case where the covariance matrix is not used (triangle). That is, if the number of receive antennas and reception layers is less than 10, computational complexity gain is obtained when the covariance matrix is used. In contrast, when the number of receive antennas and reception layers increases, computational complexity gain is obtained when the covariance matrix is not used.

In consideration of this, the MIMO receiver may determine whether the covariance matrix is used, when the number of antennas, the number of reception layers and the algorithm iteration number are predetermined.

In the table of FIG. 18, a difference in computational complexity according to the iteration number is shown. As described above, if the iteration number is 2 and the number of reception layers is greater than 10, computational complexity of the case where the covariance matrix is used is higher than that of the case where the covariance matrix is not used. However, as the computational iteration number increases, increment of computational complexity is reduced when the covariance matrix is used. In Table 18, a horizontal axis denotes the number of reception layers and a vertical axis denotes the number of receive antennas, for each iteration number of the numerical analysis algorithm. The number of reception layers is always less than or equal to the number of receive antennas.

The numeral represented in percent in each cell of FIG. 18 means a ratio of computational complexity of the case where the covariance matrix is used to computational complexity of the case where the covariance matrix is not used. That is, if the numeral represented in percent in each cell is a positive number, computational complexity gain is obtained (that is, the computational complexity is relatively low) when the covariance matrix is used and, if the numeral represented in percent in each cell is a negative number, computational complexity gain is obtained when the covariance matrix is not used. As can be seen from FIG. 18, as the number of antennas decreases, as the number of reception layers decreases and as the iteration number increases, computational complexity gain is obtained when the covariance matrix is used.

The MIMO receiver may determine whether the covariance matrix is applied in consideration of at least one of the number of receive antennas, the number of reception layers and the iteration number as described with reference to FIGS. 17 and 18. Since performance is constant regardless of whether the covariance matrix is applied, the MIMO receiver can always obtain low computational complexity by selectively applying the covariance matrix. The MIMO receiver may generate and use computational complexities for determining whether the covariance matrix is used in advance in the form of a lookup table shown in FIG. 18. The MIMO receiver generates the covariance matrices with respect to the REs upon determining that the computational complexity of the case where the covariance matrix is used is advantageous and, otherwise, does not generate the covariance matrix.

As described above, the MIMO receiver determines whether the covariance matrix is used in advance, from the viewpoint of computational complexity. If the covariance matrix is used, the covariance matrices of the REs included in the RE group may be generated and used to process the received signals. As the number of reception layers decreases or as the iteration number of the algorithm increases, improvement of computational complexity due to use of the covariance matrix increases. Through the proposed method, the MIMO receiver can reduce computational complexity without performance deterioration.

4. Apparatus Configuration

FIG. 19 is a block diagram showing the configuration of a UE and a base station according to one embodiment of the present invention.

In FIG. 19, a UE 100 and the base station 200 may include radio frequency (RF) units 110 and 210, processors 120 and 220 and memories 130 and 230, respectively. Although a 1:1 communication environment between the UE 100 and the base station 200 is shown in FIG. 19, a communication environment may be established between a plurality of UEs and the base station 200. In addition, the base station 200 shown in FIG. 19 is applicable to a macro cell base station and a small cell base station.

The RF units 110 and 210 may include transmitters 112 and 212 and receivers 114 and 214, respectively. The transmitter 112 and the receiver 114 of the UE 100 are configured to transmit and receive signals to and from the base station 200 and other UEs and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the UE 100 may perform the methods of the various embodiments of the present invention.

The transmitter 212 and the receiver 214 of the base station 200 are configured to transmit and receive signals to and from another base station and the UEs and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the UE 100 and the base station 200 instruct (for example, control, adjust, or manage) the operations of the UE 100 and the base station 200, respectively. The processors 120 and 220 may be connected to the memories 130 and 180 for storing program code and data, respectively. The memories 130 and 180 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

The present invention can also be embodied as computer-readable code on a computer-readable recording medium. The computer-readable recording medium includes all data storage devices that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network coupled computer systems so that the computer readable code is stored and executed in a distributed fashion.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of processing received signals at a multiple input multiple output (MIMO) receiver including a plurality of antennas, the method comprising:
   selecting a reference resource element (RE) from an RE group including a plurality of REs;
   generating a preprocessing filter to be shared among the plurality of REs of the RE group based on channel information of the reference RE;
   generating covariance matrices of the REs except for the reference RE based on channel information of the REs except for the reference RE of the plurality of REs; and
   generating detection signals of the RE group by compensating for the received signals of the plurality of REs by selectively using the preprocessing filter and the covariance matrices.

2. The method according to claim 1, wherein the generating the detection signals includes determining whether the covariance matrices are used, based on at least one of the number of receive antennas of the MIMO receiver, the number of layers of the received signals and a predetermined iteration number of the compensation process.

3. The method according to claim 2, wherein the covariance matrices are generated upon determining that computational complexity of the case where the covariance matrices are used is less than that of the case where the covariance matrices are not used, based on at least one of the number of receive antennas, the number of layers and the iteration number.

4. The method according to claim 3, wherein the generating the detection signals includes compensating for the received signals using the channel information of the plurality of REs and the preprocessing filter, if the computational complexity of the case where the covariance matrices are used is higher than that of the case where the covariance matrices are not used.

5. The method according to claim 1, wherein the generating the detection signals includes compensating for the reference RE using only the preprocessing filter and compensating for the REs except for the reference RE using the preprocessing filter and the covariance matrices.

6. The method according to claim 1, wherein:
the generating the covariance matrices includes generating a covariance matrix of the reference RE based on the channel information of the reference RE, and
the generating the detection signals includes compensating for the received signal of the reference RE using the preprocessing filter and the covariance matrix of the reference RE with respect to the reference RE.

7. The method according to claim 1, wherein the preprocessing filter is a matrix for improving the speed of a process of compensating for the received signals and generating the detection signals.

8. The method according to claim 1, wherein:
the generating the detection signals includes iteratively performing the compensation process until an error between each detection signal and a result obtained by applying a minimum mean square error (MMSE) filter, a zero filter (ZF) filter, an interference rejection combining (IRC) filter or a BLAST filter to each RE instead of the preprocessing filter becomes less than a threshold, and
a maximum iteration number of the compensation process is determined according to a MIMO channel environment or user input.

9. The method according to claim 1, wherein the detection signals are generated by applying a conjugate gradient (CG) algorithm, a Newton method algorithm or a steepest descent method algorithm to the received signals using the covariance matrices.

10. A multiple input multiple output (MIMO) receiver including a plurality of antennas and configured to process signals received through the plurality of antennas, the MIMO receiver comprising:
a transmitter;
a receiver; and
a processor connected to the transmitter and the receiver and configured to process the received signals,
wherein the processor:
selects a reference resource element (RE) from an RE group including a plurality of REs;
generates a preprocessing filter to be shared among the plurality of REs of the RE group based on channel information of the reference RE;
generates covariance matrices of the REs except for the reference RE based on channel information of the REs except for the reference RE of the plurality of REs; and
generates detection signals of the RE group by compensating for the received signals of the plurality of REs by selectively using the preprocessing filter and the covariance matrices.

11. The MIMO receiver according to claim 10, wherein the processor determines whether the covariance matrices are used, based on at least one of the number of receive antennas of the MIMO receiver, the number of layers of the received signals and a predetermined iteration number of the compensation process.

12. The MIMO receiver according to claim 11, wherein the covariance matrices are generated upon determining that computational complexity of the case where the covariance matrices are used is less than that of the case where the covariance matrices are not used, based on at least one of the number of receive antennas, the number of layers and the iteration number.

13. The MIMO receiver according to claim 12, wherein the processor compensates for the received signals using the channel information of the plurality of REs and the preprocessing filter, if the computational complexity of the case where the covariance matrices are used is higher than that of the case where the covariance matrices are not used.

14. The MIMO receiver according to claim 10, wherein the processor compensates for the reference RE using only the preprocessing filter and compensates for the REs except for the reference RE using the preprocessing filter and the covariance matrices.

15. The MIMO receiver according to claim 10, wherein the processor generates a covariance matrix of the reference RE based on the channel information of the reference RE and compensates for the received signal of the reference RE using the preprocessing filter and the covariance matrix of the reference RE with respect to the reference RE.

16. The MIMO receiver according to claim 10, wherein the preprocessing filter is a matrix for improving the speed of a process of compensating for the received signals and generating the detection signals.

17. The MIMO receiver according to claim 10, wherein:
the processor iteratively performs the compensation process until an error between each detection signal and a result obtained by applying a minimum mean square error (MMSE) filter, a zero filter (ZF) filter, an interference rejection combining (IRC) filter or a BLAST filter to each RE instead of the preprocessing filter becomes less than a threshold, and
a maximum iteration number of the compensation process is determined according to a MIMO channel environment or user input.

18. The MIMO receiver according to claim 10, wherein the detection signals are generated by applying a conjugate gradient (CG) algorithm, a Newton method algorithm or a steepest descent method algorithm to the received signals using the covariance matrices.

* * * * *